United States Patent
Ikerd, Jr. et al.

(10) Patent No.: US 6,931,744 B1
(45) Date of Patent: Aug. 23, 2005

(54) PORTABLE BRAKE PAD MEASURING TOOL

(76) Inventors: Terry L. Ikerd, Jr., 3500 Crather Rd., Cleveland, OH (US) 44109; Nels Johnson, 4824 Tea Rose Ct., Lutz, FL (US) 33538

(*) Notice: Subject to any disclaimer, the term of this patent is extended or adjusted under 35 U.S.C. 154(b) by 0 days.

(21) Appl. No.: 10/794,851

(22) Filed: Mar. 8, 2004

(51) Int. Cl.[7] .................................. G01B 3/30
(52) U.S. Cl. ................................. 33/501.45; 33/609
(58) Field of Search .............. 33/501.45, 501.09, 33/501.08, 501.1, 501.3, 501.5, 501.05, 201, 203, 600, 602, 609, 610; 81/436, 121.1; D10/64

(56) References Cited

U.S. PATENT DOCUMENTS

| | | | | |
|---|---|---|---|---|
| 2,807,179 A | * | 9/1957 | Rudd, Sr .................... 81/440 |
| 3,340,751 A | * | 9/1967 | Figgis ....................... 81/436 |
| D229,222 S | * | 11/1973 | Paulk ........................ D10/64 |
| 3,945,471 A | | 3/1976 | Shimizu |
| D246,512 S | * | 11/1977 | McFarland et al. .......... D10/64 |
| D258,352 S | * | 2/1981 | Morgan ...................... D10/73 |
| D313,763 S | * | 1/1991 | Hamatani .................... D10/64 |
| 4,982,627 A | * | 1/1991 | Johnson ..................... 81/121.1 |
| 4,991,310 A | * | 2/1991 | Melia ........................ 33/609 |
| 5,079,978 A | * | 1/1992 | Kupfer ....................... 81/119 |
| 5,471,757 A | * | 12/1995 | McDonald ................... 33/501.45 |
| D366,430 S | * | 1/1996 | Grundl ....................... D10/65 |
| 5,511,286 A | * | 4/1996 | Williams et al. ............. 16/422 |
| 5,608,376 A | | 3/1997 | Ito et al. |
| 5,875,558 A | * | 3/1999 | Bakke et al. ............... 33/501.45 |
| 6,047,606 A | * | 4/2000 | Sibole ....................... 73/865.8 |
| 6,237,723 B1 | | 5/2001 | Salsman .................... 188/1.11 W |
| 6,257,098 B1 | * | 7/2001 | Cirone ....................... 81/119 |
| 6,302,241 B1 | | 10/2001 | Gronowicz, Jr. |
| 6,340,074 B1 | | 1/2002 | Lumpkin et al. |
| 6,359,690 B1 | | 3/2002 | Discenzo et al. |
| 6,601,481 B2 | * | 8/2003 | Chuang ...................... 81/440 |
| 6,681,662 B2 | * | 1/2004 | Blackston ................... 81/451 |
| 2004/0200084 A1 | * | 10/2004 | Wang ........................ 33/501.45 |

* cited by examiner

Primary Examiner—R. Alexander Smith
(74) Attorney, Agent, or Firm—John D. Gugliotta; P. Jeff Martin

(57) ABSTRACT

A brake pad measuring tool is disclosed and functions to provide a quick visual indicator for determining brake pad wear condition in motor vehicles. The brake pad measuring tool includes a plurality of rigid bars which are attached in a reciprocal and rotatable manner via a coupling ring. Each of the rigid bars has a free end provided with a color-coded bar segment. The rigid bars also have descending incremental widths which correspond to a specific color cast by each color-coded bar segment, thus serving as a quick visual indicator for pad wear condition. The brake pad measuring tool allows for a brake pad's condition to be determined while the vehicle wheel is still attached to the hub.

14 Claims, 4 Drawing Sheets

PORTABLE BRAKE PAD MEASURING TOOL

RELATED APPLICATIONS

The present invention was first described in Disclosure Document Deposit Request mailed on Jul. 24, 2003 for registration under 35 U.S.C. §122, 37 C.F.R. §1.14, and MPEP §1706. There are no previously filed, nor currently any co-pending applications, anywhere in the world.

BACKGROUND OF THE INVENTION

1. Field of the Invention

The present invention relates generally to devices for measuring brake pad wear and, more particularly, to a portable brake pad measuring tool.

2. Description of the Related Art

Brake pads in vehicles are prone to frictional wear. The pads wear rather quickly through vehicle usage and require periodic replacement. Drivers typically rely upon dashboard warning lights or the squeal emanating from the brakes to alert them of excessive brake pad wear. An inspection of the brake pads requires the tedious removal of the wheel from the vehicle hub in order to perform a visual test to; determine pad wear condition. However, most individuals are either disinclined or unable to perform such inspection, and still others who are willing lack proficiency to make a proper evaluation. Neglecting pad wear could result not only in inconvenience and extreme expense, but could result in ultimate brake failure, thus leading to an accident.

Accordingly, there is a need for a lightweight, portable device which can measure brake pad wear without requiring vehicle wheel removal in a manner which is quick, easy, and effective. The development of the brake pad measuring tool fulfills this need.

A search of the prior art did not disclose any patents that read directly on the claims of the instant invention; however, the following references were considered related.

The following patents disclose brake pad wear indicator devices:

U.S. Pat. No. 6,302,241 B1, issued in the name of Gronowicz, Jr.;

U.S. Pat. No. 3,945,471, issued in the name of Shimizu;

U.S. Pat. No. 5,608,376, issued in the name of Ito et al.; and

U.S. Pat. No. 6,237,723 B1, issued in the name of Salsman.

U.S. Pat. No. 6,340,074 B1, issued in the name of Lumpkin et al. discloses a pad wear compensator for a disc brake caliper for bicycles.

U.S. Pat. No. 6,359,690 B1, issued in the name of Discenzo et al. discloses an apparatus, a system, and a method for determining wear and rate of wear of articles such as a carbon brush, a brake pad, or a tire.

Consequently, a need has been felt for a lightweight, portable device which can measure brake pad wear without requiring vehicle wheel removal in a manner which is quick, easy, and effective.

SUMMARY OF THE INVENTION

Therefore, it is an object of the present invention to provide a portable, lightweight brake pad measuring tool.

It is another object of the present invention to provide a brake pad measuring tool which allows brake pad condition to be measured without removing a vehicle's wheel.

It is another object of the present invention to provide a plurality of measuring bars of descending, incremental widths adapted to provide measurements within $\frac{1}{32}$ inch.

It is another object of the present invention to provide a coupling ring for securing the measuring bars in an organized manner.

It is another object of the present invention to provide color-coded bar segments which correspond to brake pad conditions such as safe, warning, or danger to quickly and easily inform operator if pad replacement is required.

It is still another object of the present invention to provide measuring bars engraved with identification indicia.

Briefly described according to one embodiment of the present invention, a brake pad measuring tool is disclosed and functions to provide a quick visual indicator for determining brake pad wear condition in motor vehicles and more particularly in medium-duty trucks. The brake pad measuring tool comprises a plurality of rigid bars being attached in a reciprocal and rotatable manner via a coupling ring.

Each of the rigid bars are generally straight and have a free end opposing a bound end. A ring-receiving hole extends horizontally through each of the rigid bars along the bound end thereof, through which the coupling ring is threaded, thereby holding the rigid bars in an efficient and organized manner. The free end has a right-angled foot segment which includes a heel portion adapted to provide a visual brake pad wear indicator.

Each of the rigid bars are further provided with a color-coded bar segment which extends downward a linear length from the bound end thereof. The rigid bars define descending incremental widths which correspond to a specific color cast by each color-coded bar segment so as to provide a quick visual indicator for pad wear condition.

A flattened heel portion of each right-angled foot segment is placed in flush engagement against an outer periphery of a selected brake pad. Each right-angled foot segment is powder-coated with a light colored boot in order to provide a sharp contrast in color with respect to the boot and brake pad, thereby facilitating a quick visual indication of pad wear condition. The design and configuration of the brake pad measuring tool 10 allows for a brake pad's condition to be determined while vehicle wheel is still attached to hub. Brake pad condition is determined through random selection of the rigid bars utilizing a trial-and-error approach in order to establish which particular rigid bar provides for an accurate visual indication of brake pad condition.

The use of the present invention allows for vehicle brake pad life to be measured without requiring vehicle wheel removal in a manner which is quick, easy, and efficient.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1:
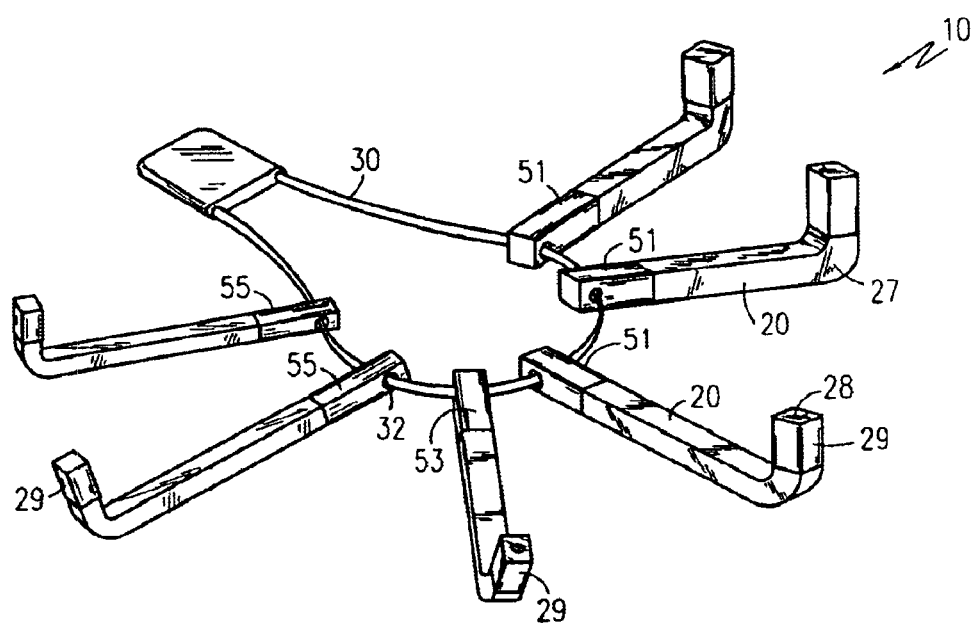
FIG. 1 is a perspective view of a brake pad measuring tool according to the preferred embodiment of the present invention.
Figure 2:
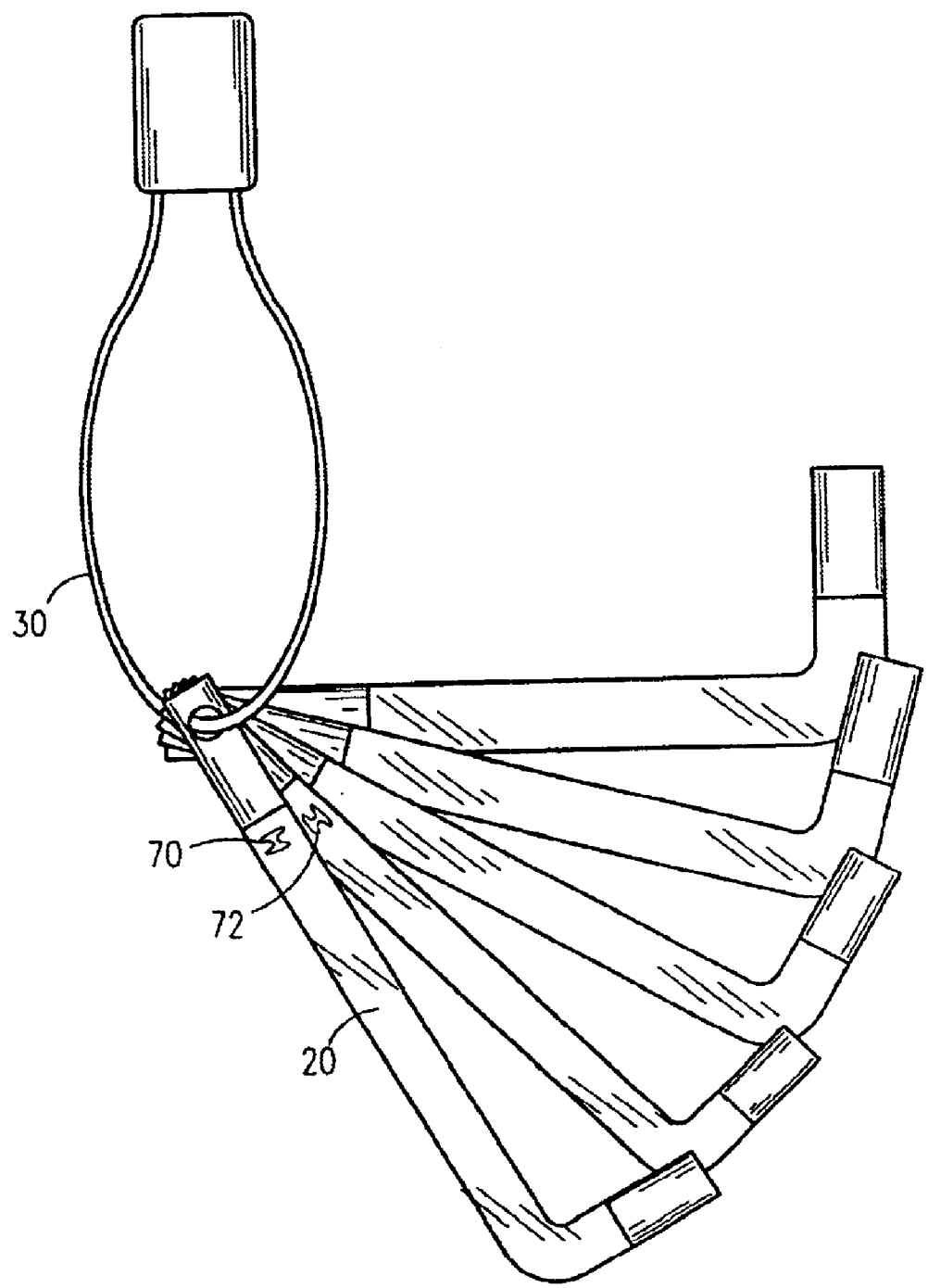
FIG. 2 is a side elevational view thereof.
Figure 3:
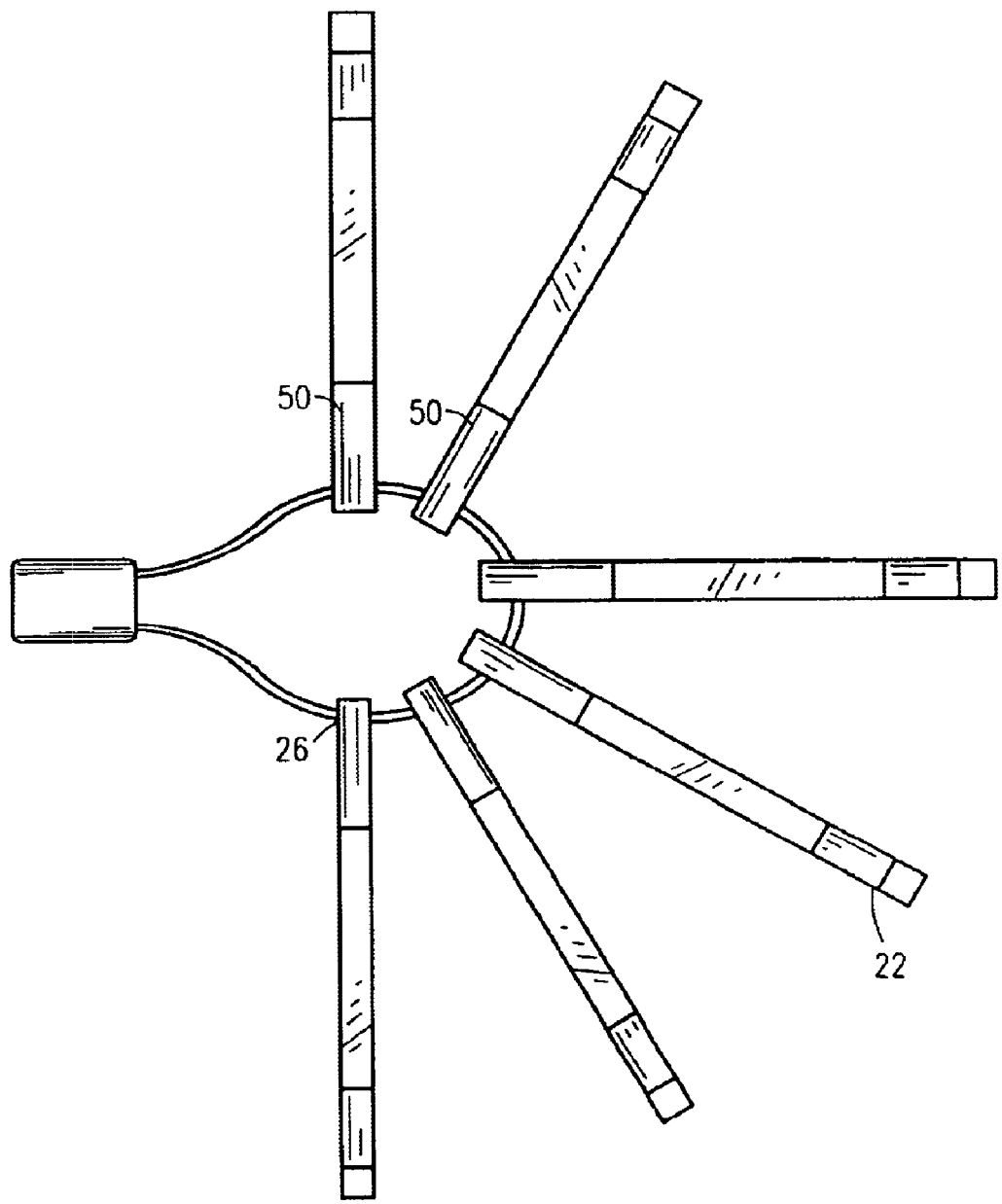
FIG. 3 is a bottom planar view thereof.
Figure 4:
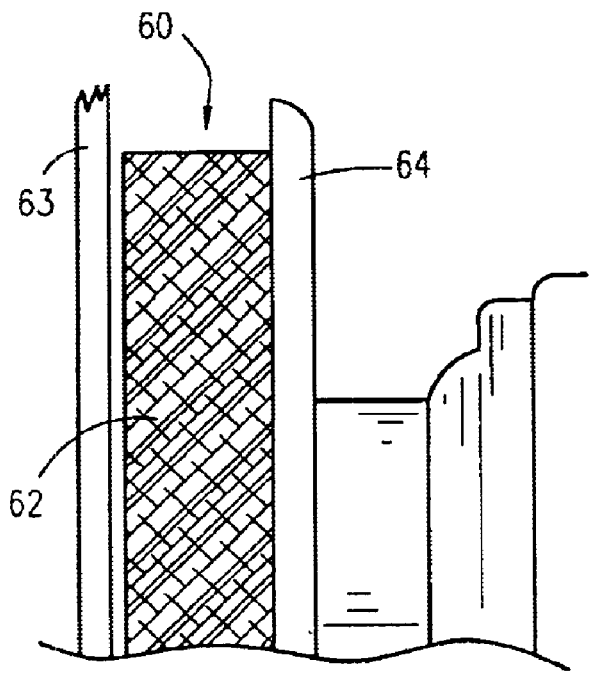
FIG. 4 is a side elevational view of a brake pad.
Figure 5:
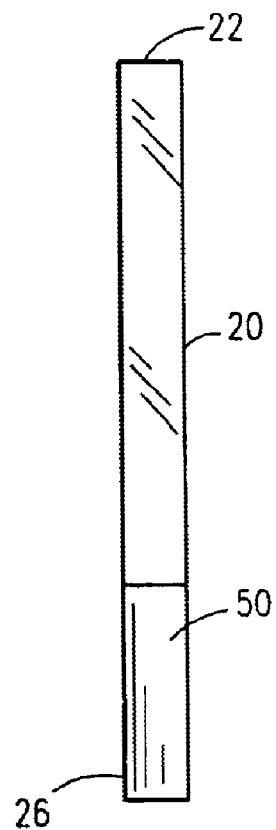
FIG. 5 is a top planar view of a rigid bar according to the preferred embodiment of the present invention.

Referring now to FIGS. 1–5, a brake pad measuring tool 10 is shown, according to the present invention, comprised of a plurality of rigid bars 20, each defining an elongated, rectangular configuration, and being attached in a reciprocal and rotatable manner via a coupling ring 30. For purposes of this disclosure, six rigid bars 20 are described and illustrated, however, the number of rigid bars 20 is envisioned as being variable, and thus the number shown herein is not intended to be a limiting factor.

Each of the rigid bars 20 are further defined as generally straight and having a free end 22 opposing a bound end 26. A ring-receiving hole 32 extends horizontally through each of the rigid bars 20 along the bound end 26 thereof, through which the coupling ring 30 is threaded, thereby holding the rigid bars 20 in an efficient and organized manner.

The free end 22 of the rigid bars 20 has a right-angled foot segment 27 which includes a flattened heel portion 28 adapted to provide a visual brake pad wear indicator (to be described in greater detail below). Each of the rigid bars 20 are provided with a color-coded bar segment 50 extending downward a linear length from the bound end 26 thereof. The rigid bars 20 define descending incremental widths which correspond to a specific color cast by each color-coded bar segment 50 so as to provide a quick visual indicator for pad wear condition. For example, the first three rigid bars 20 are provided with a safe color segment 51, or green, to indicate pad wear is small or minimal, and therefore it is safe to proceed and pad 60 replacement is not required. A fourth rigid bar 20 is provided with a warning color segment 53, or yellow, to indicate the brake pad 60 is still safe and effective, but is approaching the time for replacement. The fifth and sixth rigid bars 20 are provided with a danger color segment 55, or red, to indicate brake pad 60 is unsafe and must be replaced.

In order to provide a quick visual indication of pad wear condition, the flattened heel portion 28 of each right-angled foot segment 27 of each of the rigid bars 20 is placed between the rotor 63 and the brake pad backing plate 64 in order to obtain an accurate reading within 1/64 inch. Each right-angled foot segment 27 is powder-coated with a light colored boot 29, for example white, in order to provide a sharp contrast in color with respect to the boot 29 and brake pad 60, thereby facilitating a quick visual indication of pad wear condition. The design and configuration of the brake pad measuring tool 10 allows for a brake pad's condition to be determined while vehicle wheel (not shown) is still attached to hub. User determines brake pad condition through random selection of the rigid bars 20 utilizing a trial-and-error approach in order to establish which particular rigid bar 20 provides for an accurate visual indication of brake pad 60 condition. More specifically, user randomly selects a flattened heel portion 28 having a width which most closely matches a width of the outer periphery 62 of the chosen brake pad 60.

The rigid bars 20 are sized in descending incremental widths to provide measurements within 1/64 inch, thereby being compliant with Department of Transportation standards.

It is envisioned that the rigid bars 20 are fabricated from materials which include but are not limited to steel, aluminum, and rigid plastic.

It is further envisioned that the rigid bars 20 are powder-coated, as painting leaves surfaces more susceptible to rust and chipping, powder-coating is the preferred method of coloring rigid bars 20.

It is still further envisioned that each of the rigid bars 20 are provided with identification Indicia 70, shown herein as engraved numerals 72, inscribed along a lateral sidewall thereof below the color-coded bar segment 50.

The brake pad measuring tool 10 provides a lightweight, portable device which facilitates quick and easy pad wear measurement in an organized and efficient manner.

2. Operation of the Preferred Embodiment

To use the present invention, without removing the vehicle's wheels, user bears a flattened heel portion 28 of each right-angled foot segment 27 of each of the rigid bars 20 against an outer periphery 62 of a selected brake pad. User determines brake pad condition through random selection of the rigid bars 20 utilizing a trial-and-error approach in order to establish which particular rigid bar 20 provides for an accurate visual indication of brake pad 60 condition. More specifically, user randomly selects a flattened heel portion 28 having a width which most closely matches a width of the outer periphery 62 of the chosen brake pad 60, then checks the color-coded segment 50 thereof, which informs user whether the pads 60 require replacement or not.

The use of the present invention allows for vehicle brake pad life to be measured without requiring vehicle wheel removal in a manner which is quick, easy, and efficient.

Therefore, the foregoing description is included to illustrate the operation of the preferred embodiment and Is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. A brake pad measuring tool comprising:

a plurality of rigid bars, said plurality of rigid bars each defining an elongated, rectangular configuration, and being attached in a reciprocal and rotatable manner via a coupling ring, said plurality of rigid bars are each further defined as generally straight and having a free end opposing a bound end, and wherein said plurality of rigid bars allows for a brake pad condition to be determined while a vehicle wheel is attached to vehicle wheel hub;

a ring-receiving hole, said ring-receiving hole extends horizontally through said bound end of each of said plurality of rigid bars, said ring-receiving hole having said coupling ring threaded therethrough, thereby holding said plurality of rigid bars in an efficient and organized manner; and a right-angled foot segment, said right-angled foot segment is provided along said free end, wherein said right-angled foot segment includes a flattened heel portion adapted to provide a visual brake pad wear indicator.

2. The brake pad measuring tool of claim 1, wherein said plurality of rigid bars are each provided with a color-coded bar segment extending downward a linear length from said bound end.

3. The brake pad measuring tool of claim 2, wherein said plurality of rigid bars define descending incremental widths being sized in such a manner so as to provide brake pad measurements within 1/64 inch, and wherein said descending incremental widths correspond to a specific color cast by each said color-coded bar segment, thereby also providing a quick visual indicator for pad wear condition.

4. The brake pad measuring tool of claim 3, wherein said plurality of rigid bars are provided with identification indicia inscribed along a lateral sidewall of each of said plurality of rigid bars below said color-coded bar segment.

5. The brake pad measuring tool of claim 4, wherein said identification indicia is defined as engraved numerals.

6. The brake pad measuring tool of claim 2, wherein said plurality of rigid bars comprise six in number.

7. The brake pad measuring tool of claim 2, wherein said color-coded bar segment of a first three rigid bars of said plurality of rigid bars are provided with a safe color segment to indicate pad wear is small or minimal.

8. The brake pad measuring tool of claim 7, wherein said safe color segment is powder-coated in a green color.

9. The brake pad measuring tool of claim 2, wherein said color-coded bar segment of a fourth rigid bar of said plurality of rigid bars are provided with a warning color segment to indicate the brake pad is still safe and effective but requires soon replacement.

10. The brake pad measuring tool of claim 9, wherein said warning color segment is powder-coated in a yellow color.

11. The brake pad measuring tool of claim 2, wherein said color-coded bar segment of a fifth and sixth rigid bar of said plurality of rigid bars are provided with a danger color segment to indicate the brake pad is unsafe and must be replaced.

12. The brake pad measuring tool of claim 11, wherein said danger color segment is powder-coated in a red color.

13. The brake pad measuring tool of claim 1, wherein said right-angled foot segment is powder-coated with a light colored boot in order to provide a sharp contrast in color with respect to said light colored boot and a brake pad.

14. The brake pad measuring tool of claim 13, wherein said light colored boot is generally white in color.

\* \* \* \* \*